US011044851B2

(12) United States Patent
Hamilton

(10) Patent No.: US 11,044,851 B2
(45) Date of Patent: Jun. 29, 2021

(54) ADJUSTABLE STUFFER CHUTE

(71) Applicant: AGCO Corporation, Duluth, GA (US)

(72) Inventor: Kevin J. Hamilton, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 85 days.

(21) Appl. No.: 16/470,509

(22) PCT Filed: Oct. 26, 2017

(86) PCT No.: PCT/IB2017/001294
§ 371 (c)(1),
(2) Date: Jun. 17, 2019

(87) PCT Pub. No.: WO2018/109544
PCT Pub. Date: Jun. 21, 2018

(65) Prior Publication Data
US 2020/0375115 A1 Dec. 3, 2020

Related U.S. Application Data

(60) Provisional application No. 62/435,165, filed on Dec. 16, 2016.

(51) Int. Cl.
*A01F 15/10* (2006.01)
*A01D 90/02* (2006.01)
(52) U.S. Cl.
CPC ............ *A01F 15/101* (2013.01); *A01D 90/02* (2013.01); *A01F 2015/102* (2013.01)
(58) Field of Classification Search
CPC .. A01F 15/101; A01F 2015/102; A01F 15/10; A01F 12/28; A01D 90/02; B30B 9/301
See application file for complete search history.

(56) References Cited

U.S. PATENT DOCUMENTS 4,569,282 A * 2/1986 Galant .................... A01F 15/04
100/189
4,862,684 A * 9/1989 Naaktgeboren ....... A01F 15/101
56/341

(Continued)

FOREIGN PATENT DOCUMENTS

EP 0 276 496 A1 8/1988
EP 0324412 A1 7/1989

(Continued)

OTHER PUBLICATIONS

UK Intellectual Property Office, Search Report for related UK Application No. GB 1702474.6, dated Aug. 16, 2017.

(Continued)

*Primary Examiner* — Arpad Fabian-Kovacs

(57) ABSTRACT

A baler (10) has a stuffer chute assembly (22) with upper and lower curved walls (44, 46) forming a stuffer chamber (24). A rear portion (54) of the upper wall (44) extends downwardly and forwardly from a baling chamber (12) and a forward portion (50) extends above an inlet opening to the stuffer chamber (24). The upper wall (44) has a plurality of laterally spaced-apart wrappers (52, 56), with adjacent wrappers forming slots (70, 72) extending generally from said crop receiving inlet opening to an outlet opening (48) for cooperation with tines (40) of a feeding mechanism (36). The wrappers (52, 56) are movable relative to the lower wall (46) at a forward end (60) and at a rearward end (66) of the upper wall (44) so as to change a cross-sectional dimension of the stuffer chamber (24). The baler (10) has a forward wall adjusting mechanism (80) for setting a forward end (60) of the upper wall (44) in a predetermined position, and a rear wall adjusting mechanism (110) for setting a rear end (66) of the upper wall (44).

9 Claims, 5 Drawing Sheets

(56) References Cited

U.S. PATENT DOCUMENTS

| | | | |
|---|---|---|---|
| 6,358,142 B1* | 3/2002 | Imel | A01F 12/26 460/107 |
| 6,647,706 B2* | 11/2003 | Vogt | A01F 15/101 56/341 |
| 7,118,475 B2* | 10/2006 | Schenk | A01F 12/28 460/109 |
| 7,520,806 B2* | 4/2009 | Bundy | A01D 41/1274 460/6 |
| 9,907,232 B2* | 3/2018 | Rosseel | A01F 15/10 |
| 10,575,468 B2* | 3/2020 | Flickinger | A01F 12/181 |
| 2008/0163601 A1 | 7/2008 | Graber et al. | |
| 2011/0023440 A1* | 2/2011 | Matousek | A01F 15/10 56/341 |
| 2014/0318391 A1* | 10/2014 | Verhaeghe | A01F 15/04 100/35 |
| 2015/0296716 A1* | 10/2015 | Verhaeghe | A01F 15/04 56/432 |
| 2016/0316634 A1* | 11/2016 | Naeyaert | A01F 15/0825 |
| 2017/0339832 A1* | 11/2017 | Matousek | A01F 12/28 |
| 2020/0077594 A1* | 3/2020 | Tacke | A01F 15/10 |
| 2020/0077595 A1* | 3/2020 | Lang | A01F 15/042 |
| 2020/0170191 A1* | 6/2020 | Devroe | A01F 15/042 |
| 2020/0170192 A1* | 6/2020 | Devroe | A01F 15/046 |

FOREIGN PATENT DOCUMENTS

| | | |
|---|---|---|
| EP | 3192349 A1 | 7/2017 |
| WO | 2013/072473 A1 | 5/2013 |

OTHER PUBLICATIONS

European Patent Office, International Search Report for related International Application No. PCT/IB2017/001294, dated Feb. 27, 2018.

\* cited by examiner

ADJUSTABLE STUFFER CHUTE

BACKGROUND OF THE INVENTION

Field of Invention

The present disclosure is generally related to agricultural balers, and, more particularly to stuffer chute assemblies for agricultural balers.

Description of Related Art

Agricultural machinery, such as balers, often have a pickup assembly with a row of tines to pick up biomass from the ground and transfer the biomass to bale forming machinery internal to the baler. Such a transfer may rely on a stuffer chute as a transition between a plunger that compresses each charge in a baling chamber and the pickup assembly. To ensure that dense, compact bales are formed in an efficient manner, it is important that each charge formed in a stuffer chamber of the stuffer chute to be of sufficient density.

It is therefore desirable to be able to change the characteristics of the stuffer chamber based on the qualities of the crop to be baled.

BRIEF SUMMARY OF THE INVENTION

Briefly stated, one aspect of the invention is directed to an agricultural baler having a frame and a baling chamber mounted to said frame and extending generally fore-and-aft with respect to an intended direction of movement of the baler. A plunger is mounted for reciprocation within the baling chamber for compressing crop material fed into the baling chamber to form a bale thereof. The baler has a stuffer chute assembly with upper and lower curved walls forming a stuffer chamber. The stuffer chute assembly has a feeding mechanism with a plurality of tines for moving crop materials through the stuffer chamber and into the baling chamber, the stuffer chamber communicating at one end with a crop receiving inlet opening through which crop material travels from a pickup assembly into the baling chamber during operation of the baler and an outlet opening defined by an opening into the baling chamber at the bottom of the baling chamber. The upper wall has a rear portion that extends downwardly and forwardly from the baling chamber and a forward portion that extends generally above the inlet opening to the stuffer chamber, with the forward portion and the rear portion having higher elevations than a middle portion of the upper wall. The upper wall has a plurality of laterally spaced apart wrappers, with adjacent wrappers forming slots extending generally from said crop receiving inlet opening to said outlet opening for cooperation with said tines of the feeding mechanism. The wrappers are movable relative to the lower wall at a forward end and at a rearward end of the upper wall so as to change a cross-sectional dimension of the stuffer chamber. The baler has a forward wall adjusting mechanism for setting a forward end of the upper wall in a predetermined position, and a rear wall adjusting mechanism for setting a rear end of the upper wall in a predetermined position.

This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiment.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF PREFERRED EMBODIMENTS

Figure 1:
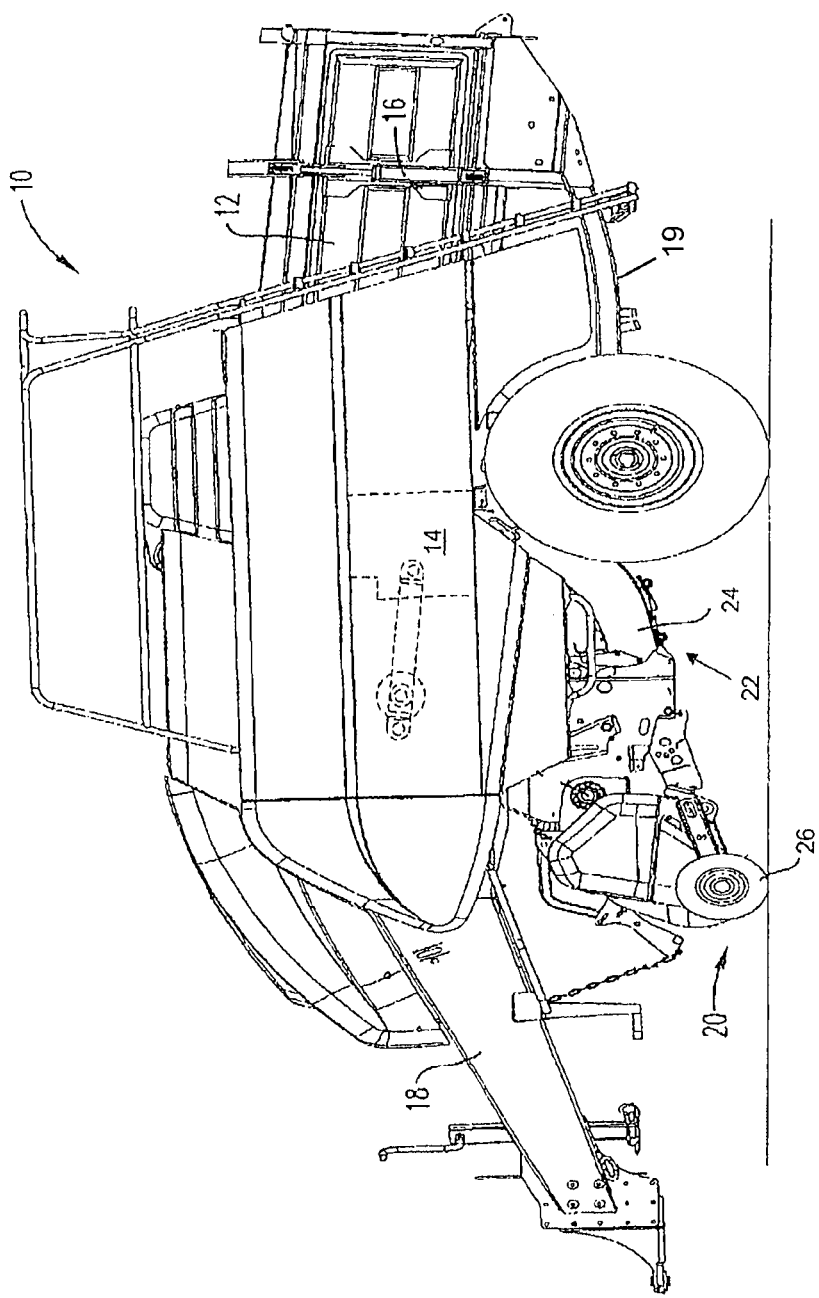
FIG. 1 is a semi-schematic diagram of an example environment in which an embodiment of a stuffer chute fill indicator may be used.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Referring now to FIG. 1, shown is a semi-schematic diagram of an example baler 10 in which certain embodiments of a stuffer chute assembly may be employed. One having ordinary skill in the art should appreciate in the context of the present disclosure that the example baler 10 is merely illustrative, and that other types of baling devices that utilize stuffer chute assemblies may be implemented, including self-propelled agricultural machines among others. The example environment, depicted in FIG. 1 as a towed square baler 10, has a fore-and-aft extending baling chamber denoted generally by the numeral 12 within which bales of crop material are prepared. In the particular illustrated embodiment, the baler 10 is an "extrusion" type baler in which the bale discharge orifice at the rear of the baler is generally smaller than upstream portions of the chamber such that the orifice restricts the freedom of movement of a previous charge and provides back pressure against which a reciprocating plunger 14 (shown in phantom) within the baling chamber 12 can act to compress charges of crop materials into the next bale. The dimensions of the discharge orifice and the squeeze pressure on the bales at the orifice are controlled by a compression mechanism broadly denoted by the reference numeral 16 in FIG. 1. The baler 10 is hitched to a towing vehicle (not shown) by a fore-and-aft tongue 18 mounted on a baler frame 19, and power for operating the various mechanisms of the baler may be supplied by a power take-off (PTO) of the towing vehicle, though not limited as such.

The baler 10 is depicted as an "in-line" type of baler wherein crop material (e.g., biomass) is picked up below and slightly ahead of baling chamber 12 and then loaded up into the bottom of chamber 12 in a straight line path of travel. A pickup assembly broadly denoted by the numeral 20 is positioned under the tongue 18 on the longitudinal axis of the machine, somewhat forwardly of the baling chamber 12. A stuffer chute assembly 22 is generally shown, and includes a charge forming stuffer chamber 24 that in one embodiment is curvilinear in shape. In some embodiments, the stuffer chamber 24 may comprise a straight duct configuration, among other geometries. For instance, the stuffer chamber 24 extends generally rearwardly and upwardly from an inlet opening just behind the pickup assembly 20 to an outlet opening at the bottom of the baling chamber 12. The plunger 14, as is known, reciprocates within the baling chamber 12 in compression and retraction strokes across the opening at the bottom of the baling chamber 12. In the portion of the plunger stroke forward of the opening, the plunger 14 uncovers the duct outlet opening, and in the rear portion of the stroke, the plunger 14 completely covers and closes off the outlet opening.

The stuffer chamber 24 defines an internal passage (also, referred to herein as a passageway) through which crop material travels from the pickup assembly 20 to the baling chamber 12 during operation of the baler 10. The front end of the stuffer chamber 24 is open to present an inlet (e.g., inlet opening) into the internal passage, and an outlet (e.g., outlet opening) of the stuffer chamber 24 is defined by the opening into the baling chamber 12. A top wall of the stuffer chamber 24 is defined by a series of laterally spaced apart wrappers that extend downwardly and forwardly from the baling chamber 12 and terminate in forward most upturned front ends generally above the inlet to the stuffer chamber 24 as will be described more fully below. The rear of pickup assembly 20 has a centrally disposed discharge opening defined in part by a transition pan, in fore-and-aft alignment with the inlet to the stuffer chamber 24, as is known.

The pickup assembly 20 has a pair of ground wheels 26 (one shown) that support the pickup assembly 20 as the baler 10 advances along the ground. The pickup assembly 20 is mounted to the front chassis of the baler 10 for pivoting movement about an upwardly and rearwardly disposed transverse pivot axis. Flotation for the pickup assembly 20 may be provided by a number of different flotation mechanisms well-known in the art. In some embodiments, at least a portion of crop material may be directly received from the towing vehicle (e.g., a combine) at the baler 10 without a pickup 20.

A relatively short, transversely channel-shaped chute (e.g., transition pan) projects rearwardly from the pickup assembly 20 and is slidably received within the front end of the stuffer chamber 24. The chute serves as a transition piece between the pickup assembly 20 and the stuffer chamber 24 for crop flow as the pickup assembly 20 rises and falls over uneven terrain relative to the stuffer chamber 24 during operation.

Figure 2:
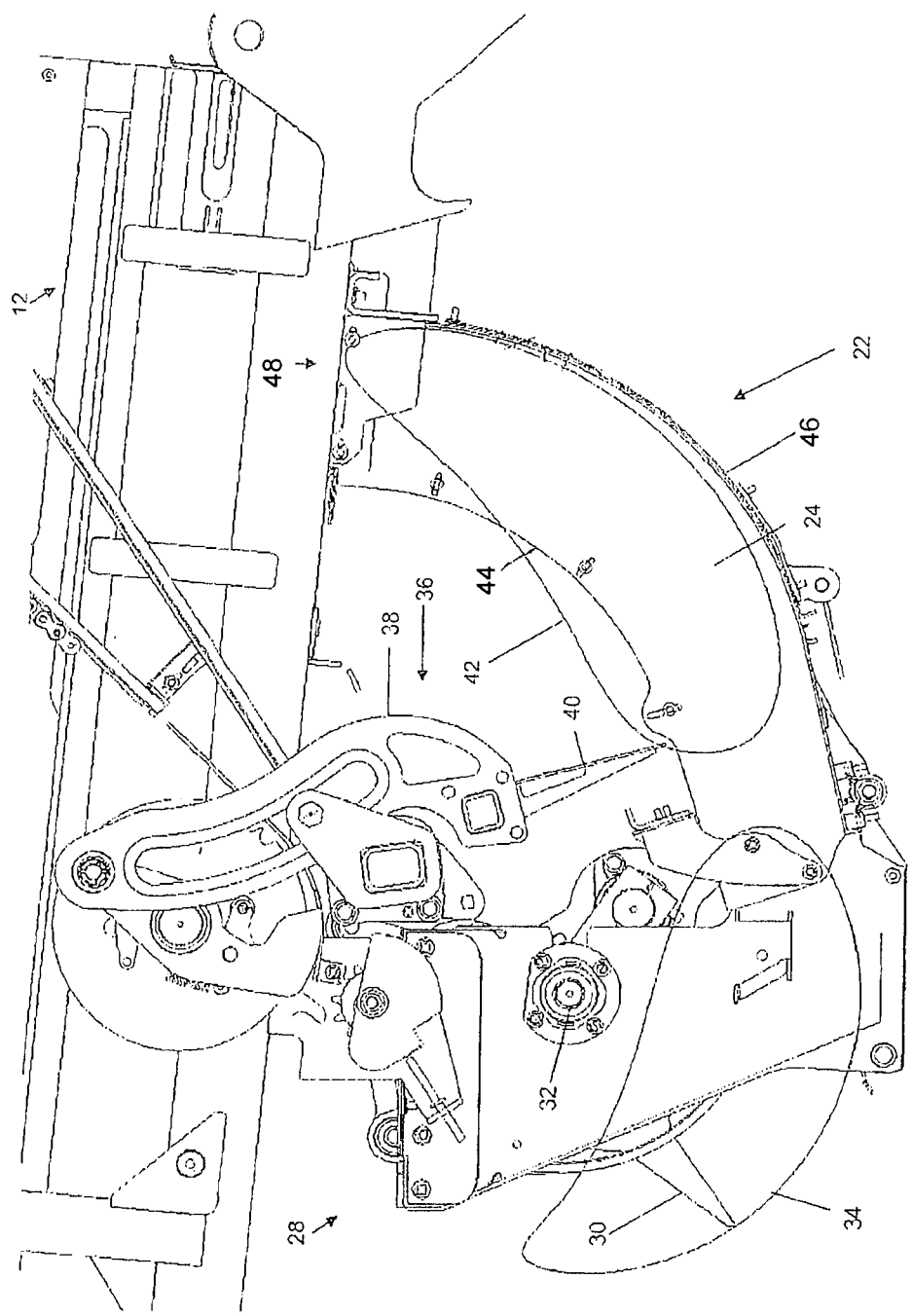
FIG. 2 is a side elevation, fragmentary view of an example stuffer chute assembly.

Having generally described an example baler 10, attention is directed to the stuffer chute assembly 22 shown in side elevation view in FIG. 2. The baler 10 may further comprise a feeding mechanism for moving crop materials through the stuffer chamber 24. Such feeding mechanism may, for example, comprise a suitable rotor associated with a cutter mechanism, or it may comprise other apparatus or be omitted in some embodiments. In some embodiments, the feeding mechanism may include a packer and a stuffer as is conventional and well understood by those skilled in the art. The packer is used to receive materials from the pickup assembly 20 and pack the same into the stuffer chamber 24 for preparing a precompressed, preshaped charge of crop materials that conforms generally to the interior dimensions of the stuffer chamber 24. The stuffer, as is explained further below, cooperates with the stuffer chute assembly 22 to sweep (e.g., using a rake that travels through its own kidney shaped path of travel) the prepared charge up into baling chamber 12 between compression strokes of the plunger 14 when the opening at the floor of the baling chamber 12 is uncovered. Certain embodiments of the stuffer chute fill indicator are disposed at least in part in the stuffer chute assembly 22 proximal to the baling chamber 12.

In the depicted example, a packer 28 is shown proximal to the front of the stuffer chute assembly 22. Crop material may be transferred from the pickup assembly 20 (FIG. 1, or in embodiments not utilizing a pickup assembly 20, bypassed and deposited directly from the towing vehicle) to a transition pan. Packing forks 30 (also referred to as tines) can grab at least a portion of the crop material collected on the transition pan and move the crop material back to the stuffer chamber 24. The packing forks 30 may be mounted along a crankshaft 32 (shaft shown in end view) and controlled by control links for moving the tips of the packing forks 30 in a generally kidney-shaped path of travel 34. The packer 28 is thus used to receive materials from the pickup assembly 20 and pack the same into the stuffer chamber 24 for preparing a precompressed, preshaped charge of crop material that conforms generally to the interior dimensions of the stuffer chamber 24 while the opening to the baling chamber 12 (the outlet of the stuffer chamber 24) is closed by a holding element.

A stuffer 36 comprises a rake 38 with plural tines (also, referred to as forks) 40. The stuffer 36; as is conventional and well understood by those skilled in the art, cooperates with the passageway of the stuffer chamber 24 and, in particular, functions to sweep through its own kidney shaped path of travel 42 to sweep the prepared charge of crop material collected between an upper wall 44 and a lower wall 46 in the stuffer chamber 24 up into baling chamber 12 via opening or outlet 48 between compression strokes of the plunger 14 when the opening to the baling chamber 12 is uncovered.

One having ordinary skill in the art should appreciate in the context of the present disclosure that the example stuffer chute assembly 22 and cooperating elements and/or sub-assemblies are merely illustrative, and that other types of configurations may be implemented in some embodiments.

Figure 3:
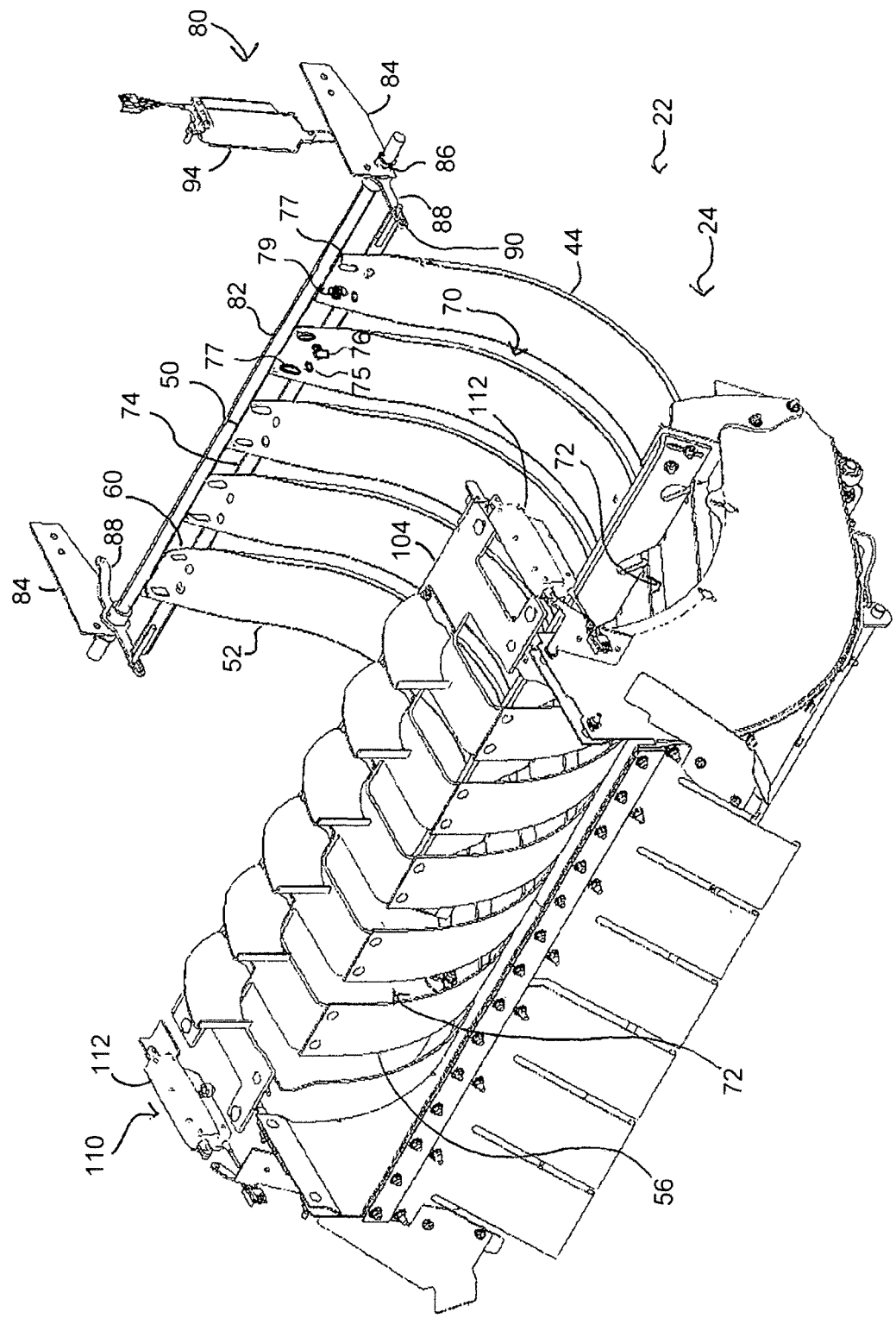
FIG. 3 is rear perspective, fragmentary view of the example stuffer chute assembly of FIG. 2.
Figure 4:
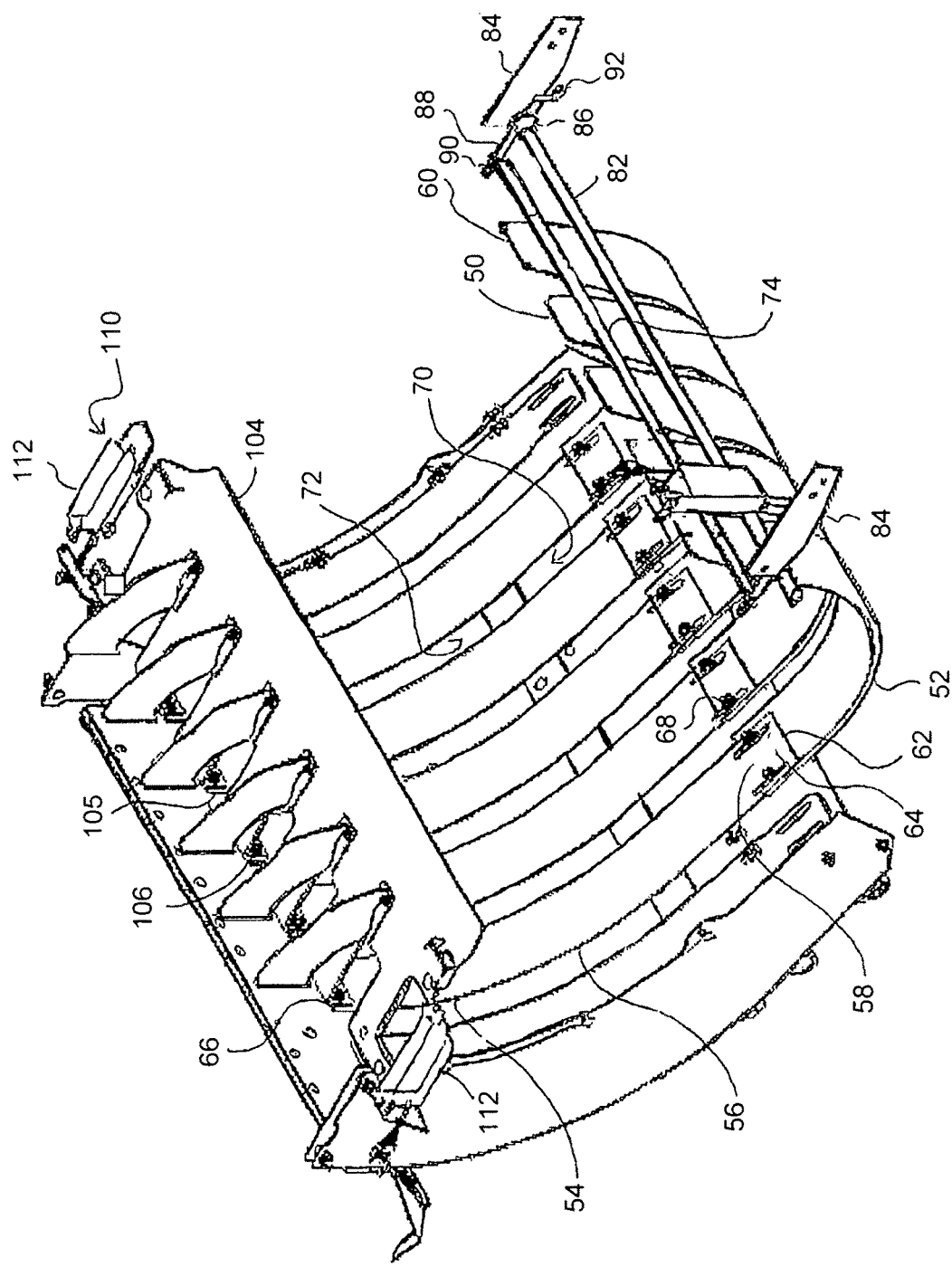
FIG. 4 is front perspective, fragmentary view of the example stuffer chute assembly.
Figure 5:
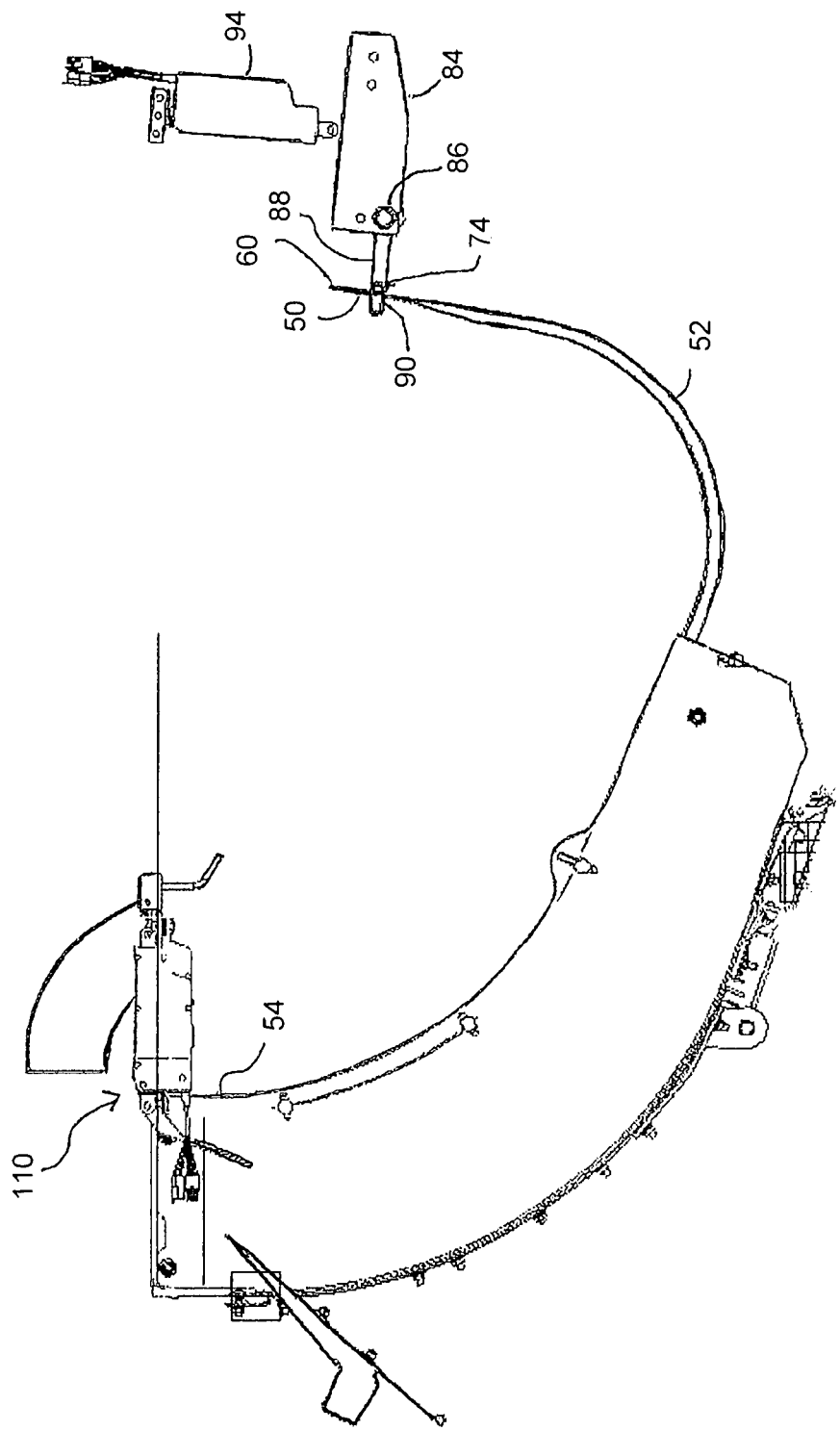
FIG. 5 is a side elevation, fragmentary view of an example stuffer chute assembly.

FIGS. 3-5 show the upper wall 44 of the stuffer chamber 24 with some components of the stuffer chute assembly 22 removed for clarity. A forward portion 50 of the upper wall 44 is defined by a series of laterally spaced apart curved packer wrappers 52 and a rear portion 54 of the upper wall 44 is defined by a series of laterally spaced apart curved stuffer wrappers 56. The packer wrappers 52 and the stuffer wrappers 56 are connected at a middle portion 58 of the upper wall 44 and combine to give the upper wall 44 a general U-shape with the forward portion 50 and the rear portion 54 having higher elevations that the middle portion

58. The packer wrappers 52 have upper ends 60 that are positioned generally above the inlet of the stuffer chamber 24 and extend downwardly and rearwardly to lower ends 62 at a low point in the middle portion 58 of the upper wall 44. The stuffer wrappers 56 have lower ends 64 that match up with lower ends 62 of the packer wrappers 52 and extend upwardly and rearwardly to upper ends 66 that terminate at the baling chamber 12. Desirably, the lower end 62 of each packer wrapper 50 is joined with the respective lower end 64 of each stuffer wrappers 56 with a bolted connection 68 that permits some degree of movement between the packer wrappers 52 and stuffer wrappers 56. However, one skilled in the art will understand that a packer wrapper 52 and a stuffer wrapper 56 may be integrally formed as a single component with the packer wrapper forming the forward part and the stuffer wrapper forming the rearward part of the components making up part of the upper wall 44.

The packer wrappers 52 are spaced to form gaps 70 between adjacent packer wrappers 52, and the stuffer wrappers 56 are spaced to form gaps 72 between adjacent stuffer wrappers 56. The packing forks 30 (FIG. 2) each extend into a respective gap 70 as part of the packing motion of the packer 28, and the tines 40 of the rake 38 each extend into a respective gap 72 as part the sweeping motion of the rake 38 to engage crop material and feed it into the opening 48 of the baling chamber 12.

According to the invention, the packer wrappers 52 and stuffer wrappers 56 that make up the curved upper wall 44 of the stuffer chamber 24 are movable relative to the lower wall 46 (FIG. 2), which is itself preferably fixed, so as to change the cross-sectional dimension of the stuffer chamber 24.

At the forward portion 50 of the upper wall 44, upper ends 60 of the packer wrappers 52 are each individually attached to an elongated connector member 74 positioned transverse to the width of the stuffer chute assembly 22. Desirably, the packer wrappers 52 have holes 75 and are bolted to the connector member 74 with suitable bolts 76. However the connection may be performed by any suitable means, such as by welding, clamping, screws, rivets, etc.

Upper ends 60 of the packer wrappers 52 are also attached to the frame 19 of the baler 10. Desirably, each of the upper ends 60 of the packer wrappers 52 has at least one elongate slot 77 configured to receive a connecting bushing 79 to allow the packer wrapper 52 to slide relative the frame 19 to allow for movement of the upper wall 44.

The connector member 74 is connected to a forward wall adjustment mechanism 80 configured to adjust the relative positions of the packer wrappers 52 mounted on the connector member 74 relative the lower wall 46. In the illustrated embodiment, the forward wall adjustment mechanism 80 includes a rockshaft 82 positioned transverse to the stuffer chute assembly 22 and rotatably mounted to mounting plates 84 affixed to the frame 19 of the baler 10. In this construction, the transverse rockshaft 82 is received at its opposing ends by the mounting plates 84. Suitable bearings 86 permit rotational movement of the rockshaft 82. A pair of crank arms 88 is fixed to rockshaft 82 at its opposing ends. Each crank arm 88 is attached to the rockshaft 82 intermediate the opposite ends of the crank arm 88. One end 90 of the crank arm 88 is connected to the connector member 74. The opposite end 92 of the crank arm 88 is connected to an actuator 94. While in the illustrated embodiment the rockshaft 82 is mounted on the crank arm 88 intermediate the actuator 94 and the connector member 74, other orientations may be used. Desirably, the actuator 94 is an electric actuator. However, one skilled in the art will understand that another type of actuator 94, such as a hydraulic actuator, may be used. The actuator 94 is used to pivot the crank arms 88 about the rockshaft 82 to move the connector member 74, and thus the upper ends 60 of the packer wrappers 52 relative the lower wall 46. In the illustrated embodiment, the actuator 94 is positioned such that, when the actuator 94 is activated, the crank arm 88 causes movement of the upper ends 60 of the packer wrappers 52 in a substantially vertical direction to primarily effect movement of the forward portion 50 of the upper wall 44. While the illustrated embodiment only shows a single actuator 94 on one side of the rockshaft 82, two actuators that preferably work in synchronous could be used to move the connector member 74 to position the upper wall 44.

Turning now to the rear portion 54 of the upper wall 44, upper ends 100 of the stuffer wrappers 56 are each individually attached to an elongated stripper plate 104 positioned transverse to the width of the stuffer chute assembly 22. Desirably, the stuffer wrappers 56 are bolted to a downward tab 105 of the stripper plate 104 with suitable bolts 106 as best seen in FIG. 4. However the connection may be performed by any suitable means, such as by welding, clamping, screws, rivets, etc. The stripper plate 104 is connected to a rear wall adjustment mechanism 110 configured to move the stripper plate 104 and thus adjust the relative positions of the stuffer wrappers 56 mounted on the stripper plate 104 relative the lower wall 46.

The rear wall adjustment mechanism 110 includes at least one actuator 112 connected between the frame 19 of the baler 10 and the stripper plate 104. In the illustrated embodiment, there is an actuator 112 on both sides of the stripper plate 104. Desirably, the actuator 112 is an electric actuator. However, one skilled in the art will understand that another type of actuator 112, such as a hydraulic actuator, may be used. The actuator 112 is used to move the stripper plate 104, and thus the upper ends 66 of the stuffer wrappers 56 relative the lower wall 46. In the illustrated embodiment, the actuator 112 is positioned such that when the actuator 112 is activated, the actuator 112 causes movement of the upper ends 66 of the stuffer wrappers 56 in a substantially horizontal direction to primarily effect movement of the rear portion 54 of the upper wall 44. While the illustrated embodiment shows two actuators 112 with one on each side of the stripper plate 104, in another embodiment only a single actuator 112 could be used to position the upper wall 44.

It will be appreciated that adjustment of the upper wall 44 can be remotely carried out from the tractor seat and in incremental amounts. The adjustment can be carried out while the baler 10 is stationary or it will also be appreciated that the present invention permits adjustment "on-the-go" while the baler 10 is still receiving and baling crop material.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. An agricultural baler comprising:
   a frame;
   a baling chamber mounted to said frame and extending generally fore-and-aft with respect to an intended direction of movement of the baler;
   a plunger mounted for reciprocation within the baling chamber for compressing crop material fed into the baling chamber to form a bale thereof;
   a stuffer chute assembly comprising a curved upper wall and a curved lower wall forming a stuffer chamber, the stuffer chute assembly comprising a feeding mechanism with a plurality of tines for moving crop materials through the stuffer chamber and into the baling chamber, the stuffer chamber communicating at one end with a crop receiving inlet opening through which crop material travels from a pickup assembly into the stuffer chamber during operation of the baler and an outlet opening defined by an opening into the baling chamber;
   wherein the upper wall has a rear portion that is defined by a series of laterally spaced apart curved stuffer wrappers that extend downwardly and forwardly from the baling chamber and a forward portion that is defined by a series of laterally spaced apart curved packer wrappers that extend generally above the inlet opening to the stuffer chamber, with the forward portion and the rear portion having higher elevations than a middle portion of the upper wall, wherein adjacent stuffer wrappers and adjacent packer wrappers form slots extending generally from said crop receiving inlet opening to said outlet opening for cooperation with said tines of the feeding mechanism, wherein the packer wrappers and the stuffer wrappers are movable relative to the lower wall at a forward end and at a rearward end of the upper wall so as to change a cross-sectional dimension of the stuffer chamber, and wherein a connecting end of each of the packer wrappers in the series of packer wrappers is connected to an associated connecting end of one of the stuffer wrappers of the series of stuffer wrappers at a middle portion of the upper wall with a movable connection;
   an forward wall adjusting mechanism connected to the packer wrappers for setting a forward end of the upper wall in a predetermined position; and
   a rear wall adjusting mechanism connected to the stuffer wrappers for setting a rear end of the upper wall in a predetermined position;
   wherein the forward wall adjusting mechanism moves the forward end of the upper wall independently of the rear wall adjusting mechanism, and the rear wall adjusting mechanism moves the rear end of the upper wall independently of the forward wall adjusting mechanism, and the moveable connection allows movement of the connecting end of each packer wrapper relative the connecting end of its associated stuffer wrapper when either the forward end or the rear end of the upper wall is moved.

2. Baler according to claim 1, wherein the lower wall is fixedly mounted to the frame.

3. The baler according to claim 1, wherein the forward portion of the upper wall and the rear portion of the upper wall combine to give the upper wall a general U-shape with the forward portion and the rear portion having higher elevations that the middle portion.

4. The baler according to claim 3, wherein the packer wrappers have upper ends that are positioned generally above the inlet opening of the stuffer chamber and extend downwardly and rearwardly to lower ends at a low point in the middle portion of the upper wall.

5. The baler according to claim 4, wherein upper ends of the packer wrappers are each individually attached to an elongated connector member positioned transverse to the width of the stuffer chute assembly.

6. The baler according to claim 5, wherein the connector member is connected to the forward wall adjustment mechanism, and wherein the forward wall adjustment mechanism includes a rockshaft positioned transverse to the stuffer chute assembly and rotatably mounted to the frame and at least one crank arm fixed to rockshaft, and an actuator, wherein the one end of the crank arm is connected to the connector member and an opposite end of the crank arm is connected to the actuator.

7. The baler according to claim 6, wherein the actuator is positioned such that when the actuator is activated, and the crank arm causes movement of the upper ends of the packer wrappers in a substantially vertical direction to effect movement of the forward portion of the upper wall.

8. The baler according to claim 6, wherein the forward wall adjusting mechanism comprises an electrical actuator.

9. The baler according to claim 1, wherein the movable connection comprises a bolt passing through connecting ends of the associated stuffer and packer wrappers.

* * * * *